United States Patent
Piole et al.

(10) Patent No.: US 6,599,056 B1
(45) Date of Patent: Jul. 29, 2003

(54) ANGLE ACCESSORY WITH VARIABLE ANGLE FOR CONDUIT

(75) Inventors: David Piole, Avoise (FR); François Perrignon De Troyes, Mont Saint Jean (FR); Bertrand Decore, La Chapelle Saint Aubin (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 09/582,584

(22) PCT Filed: Jun. 8, 1998

(86) PCT No.: PCT/FR99/01345

§ 371 (c)(1),
(2), (4) Date: Sep. 28, 2000

(87) PCT Pub. No.: WO00/25403

PCT Pub. Date: May 4, 2000

(30) Foreign Application Priority Data

Oct. 28, 1998 (FR) .............................. 98 13495

(51) Int. Cl.⁷ .................. H01R 25/16; E04F 17/08; H02G 3/06
(52) U.S. Cl. .................. 403/382; 52/288.1; 174/48
(58) Field of Search ............ 52/220.5, 287.1, 52/254, 288.1; 403/174, 382; 174/48

(56) References Cited

U.S. PATENT DOCUMENTS

| | | | | |
|---|---|---|---|---|
| 1,917,388 A | * | 7/1933 | Nelson ...................... 52/287.1 |
| 2,915,794 A | * | 12/1959 | Hillmann ................... 52/287.1 |
| 3,281,005 A | * | 10/1966 | Schumacher ................. 220/3.8 |
| 3,919,819 A | * | 11/1975 | Oliver ......................... 52/233 |
| 4,201,359 A | * | 5/1980 | Baslow .................. 52/716.1 X |
| 4,569,171 A | * | 2/1986 | Kuhr et al. ............. 52/288.1 X |
| 4,585,131 A | * | 4/1986 | Crossman et al. ...... 52/287.1 X |
| 4,589,449 A | * | 5/1986 | Bramwell .................... 138/162 |
| 4,901,496 A | * | 2/1990 | Fritz et al. ................... 52/578 |
| 5,336,849 A | * | 8/1994 | Whitney ................ 52/287.1 X |
| 5,613,339 A | * | 3/1997 | Pollock .................... 52/731.1 |
| 5,740,642 A | * | 4/1998 | Koenig, Jr. et al. ..... 52/288.1 X |
| 5,792,992 A | * | 8/1998 | Handler ................. 52/220.5 X |
| 6,323,421 B1 | * | 11/2001 | Pawson et al. ......... 52/220.1 X |
| 6,344,611 B2 | * | 2/2002 | Ewer et al. ............ 52/220.5 X |

FOREIGN PATENT DOCUMENTS

EP 0 734 107 9/1996

\* cited by examiner

*Primary Examiner*—Lynne H. Browne
*Assistant Examiner*—Ernesto Garcia
(74) *Attorney, Agent, or Firm*—Young & Thompson (57) ABSTRACT

An angle accessory includes a mask extending between the covers of two conduit sections to be connected. An angle accessory includes two supports, one for each conduit section, each of those two supports having assembling parts for being directly mounted on the corresponding conduit section base and receiving parts for jointly fixing therein the mask, the mask being divided in two separate side walls, one side wall for each support, hence one side wall for each conduit section.

26 Claims, 10 Drawing Sheets

ANGLE ACCESSORY WITH VARIABLE ANGLE FOR CONDUIT

BACKGROUND OF THE INVENTION

The present invention relates in general to conduits of the type used, for example, for supporting, housing and protecting various equipment and, in particular, various electrical equipment, and also for the support, housing and protection of conductors, pipes or other equipment necessary for serving this equipment.

DESCRIPTION OF THE RELATED ART

As is known, a conduit has, by definition, a base, having an open cross-section, by which it is fixed to any kind of surface, and a cover which, in order to close this base, must be added in a detachable manner onto the latter.

As is also known, such a conduit is used in practice in sections, particularly when, passing from a first wall to a second wall forming a dihedral with the first one, it must undergo a change of orientation.

SUMMARY OF THE INVENTION

The present invention more particularly relates to the routing accessories, commonly called angle accessories, used for establishing all the desired continuity between two conduit sections thus running over surfaces which form between them a dihedral whose angle is in practice on the whole equal to 90°.

These angle accessories form what it is commonly agreed to call an "interior angle" when the corresponding dihedral is an inward dihedral and an "exterior angle" when this dihedral is an outward dihedral, that is to say a protruding dihedral.

In all cases, they globally comprise a mask capable of extending between the covers of the two conduit sections to be connected.

This mask comprises, in practice, two side walls, one for each of the conduit sections, and for their adaptation to the latter, these side walls form a dihedral between each other, in the image of the corresponding surfaces.

There is a double problem in this case.

On the one hand, the fixing of this mask must be ensured in a satisfactory manner.

On the other hand, considering the construction tolerances which inevitably apply to the most usual buildings, this mask must be able to adapt to dihedrals whose angle differs very slightly from 90°, the value of this angle for example being between 85° and 95°.

The present invention relates even more precisely to angle accessories, commonly called variable angles, whose masks are capable of such adaptation.

According to a first and already known embodiment, the two side walls of the mask are mechanically connected to each other by a hinge, whether, as described in the French patent which, lodged under Number 78 20683, was published under Number 2 431 209, this hinge is formed by a thinner wall which, being in one piece with the two side walls, connects the latter continuously, or, more commonly, it is formed by two pivots by which the two side walls are articulated with each other.

Most often, the mechanical connection thus established between the two side walls is relatively rigid and the result of this is that any shock applied to one of these side walls is essentially transmitted to the other one, risking a possible separation of all of part of the assembly with respect to the conduit.

Furthermore, when the corresponding hinge consists of pivots, there is added to this risk the risk of a separation of the two side walls with respect to each other at the level of these pivots, particularly in the case of an exterior angle.

In the French patent which, lodged under Number 95 02753, was published under Number 2 731 496, the two side walls, not connected to each other, are jointly covered by a skin made of flexible and elastic material forming a hinge.

But although it has a certain advantage, the corresponding embodiment is relatively costly and complex.

According to a second type of already known embodiment, the two side walls of the mask are completely disassociated from each other, as is the case, for example, in the British patent which, lodged under Number 87 12133, was published under Number 2 205 200.

The fixing of these side walls is therefore carried out individually for each of them, by operating in practice directly on the base of the corresponding conduit section.

Besides a certain complexity in positioning, this almost inevitably results in difficulties in the adjustment of these side walls to one another.

The present invention relates in general to an arrangement making it possible to avoid these difficulties.

More precisely, it relates to an angle accessory for a conduit, that is to say a routing accessory intended to establish a continuity between two conduit sections each one respectively running over two walls forming a dihedral between them and each comprising a base and a cover, this angle accessory being of the type comprising a mask capable of extending between the covers of the two conduit sections and in general being characterised in that it comprises two supports, one for each conduit section, each of these two supports having, on the one hand, assembly means capable of allowing it to be mounted on the base of the corresponding conduit section and, on the other hand, receiving means capable of allowing the mask to be attached therein, and in that, in conjunction, the mask is divided into two separate side walls, one side wall for each support, and therefore one side wall for each conduit section.

Because of the presence of the two supports thus used, which act as interfaces between the side walls of the mask and the bases of the conduit sections, it is advantageously possible to reconcile an easy and adequate fixing of the mask to these conduit sections with an appropriate adjustment to one another of the two side walls of this mask, whatever the possible deviation with respect to the normal, that is to say with respect to a right angle, of the angle of the corresponding dihedral may be, provided of course that this deviation remains within the foreseen limits.

Preferably, between the two supports provided according to the invention there are means of engagement by which these two supports are, at least locally, engaged with one another.

These means of engagement advantageously allow precise positioning of the two supports with respect to each other and, because of this, they are particularly favourable to a correct adjustment of the two side walls carried by these supports, without these side walls themselves being connected to each other.

Whilst ensuring this positioning, the means of engagement acting between the two supports furthermore advantageously ensure a certain connection and a certain articulation between these supports, without however there being any real assembly operation to be applied to the latter.

Thus, whilst forming a variable angle, the angle accessory according to the invention is advantageously particularly simple to put into position and, once in position, the mask which it comprises is particularly well adjusted, to the advantage of its appearance.

Furthermore, it is advantageously particularly resistant to shocks.

Finally, the supports which the angle accessory according to the invention uses are advantageously easy and economic to mould, because, even with the means of engagement intended to act between them, their shape remains relatively simple.

BRIEF DESCRIPTION OF THE DRAWINGS

The characteristics and advantages of the invention will furthermore emerge from the following description, given by way of example with reference to the accompanying diagrammatic drawings in which.

DESCRIPTION OF THE PREFERRED EMBODIMENTS

As illustrated in these figures, and in a manner which is known in itself, the angle accessory 10 according to the invention constitutes a routing accessory intended to establish continuity between two conduit sections 11A, 11B, each of which runs along one of two surfaces 12A, 12B respectively forming a dihedral D between them and each of which comprises, according to the same overall structure, a base 13 and a cover 14.

For example, and such as shown, the surfaces 12A and 12B are walls, and the conduit sections 11A, 11B run like skirting boards along their bottoms.

In practice, the angle of the dihedral D which these surfaces 12A, 12B form is substantially a right angle to within the construction tolerances.

In the embodiment shown in FIGS. 1 to 17, this dihedral D is an outward dihedral.

As the base 13 and the cover 14 of the conduit sections 11A, 11B do not in themselves relate to the present invention, they shall not be described here in all their details.

Regarding the base 13, it will suffice to mention that, in the embodiment shown, it comprises a foot-piece 15 by which it is adapted to be applied to a surface 12A, 12B and to be fixed to the latter and, longitudinally protruding from this foot-piece 15, a plurality of ribs 16, 16', 17 and 18.

Figure 18:
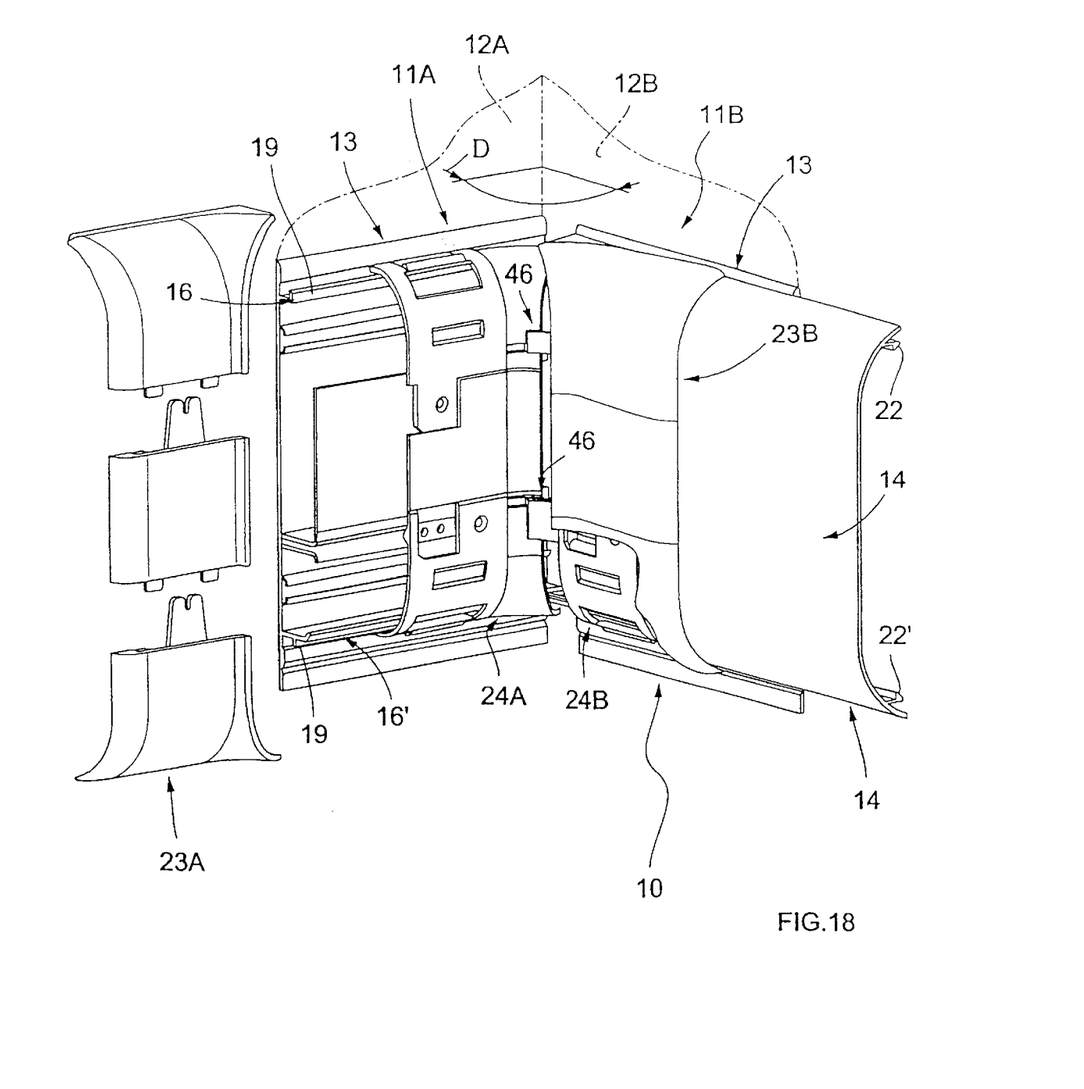
FIG. 18 is, with a local tear-away, a perspective view, partially exploded, which, being similar to FIG. 1, relates to an angle accessory according to the invention, for an embodiment corresponding to an interior angle.
Figure 19:
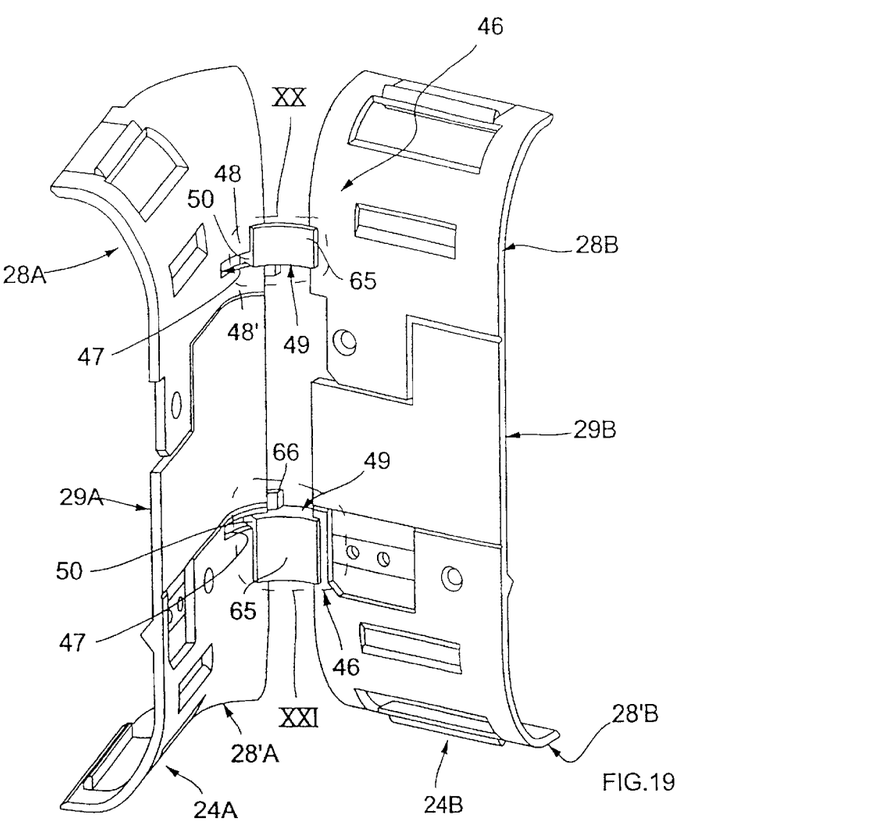
FIG. 19 is, at a bigger scale, a perspective view of the two supports which this angle accessory comprises, seen from the front.
Figure 20:
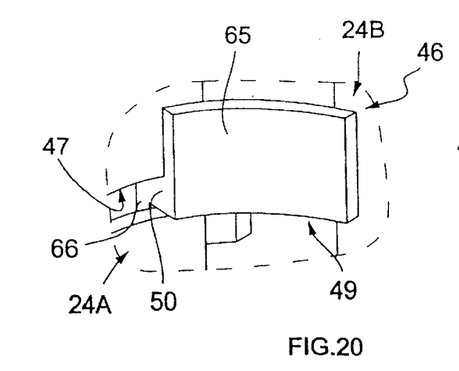
FIGS. 20 and 21 show again, at a bigger scale, the details of FIG. 19 marked by the outlines XX and XXI in this FIG. 19.
Figure 21:
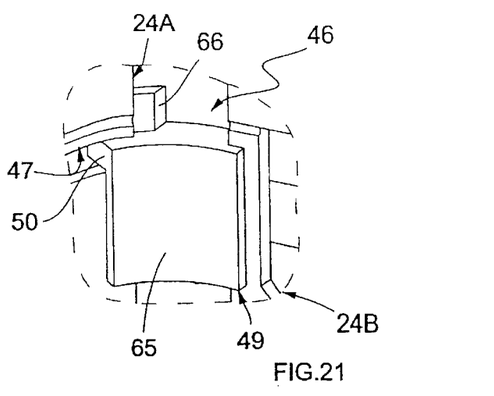
Figure 22:
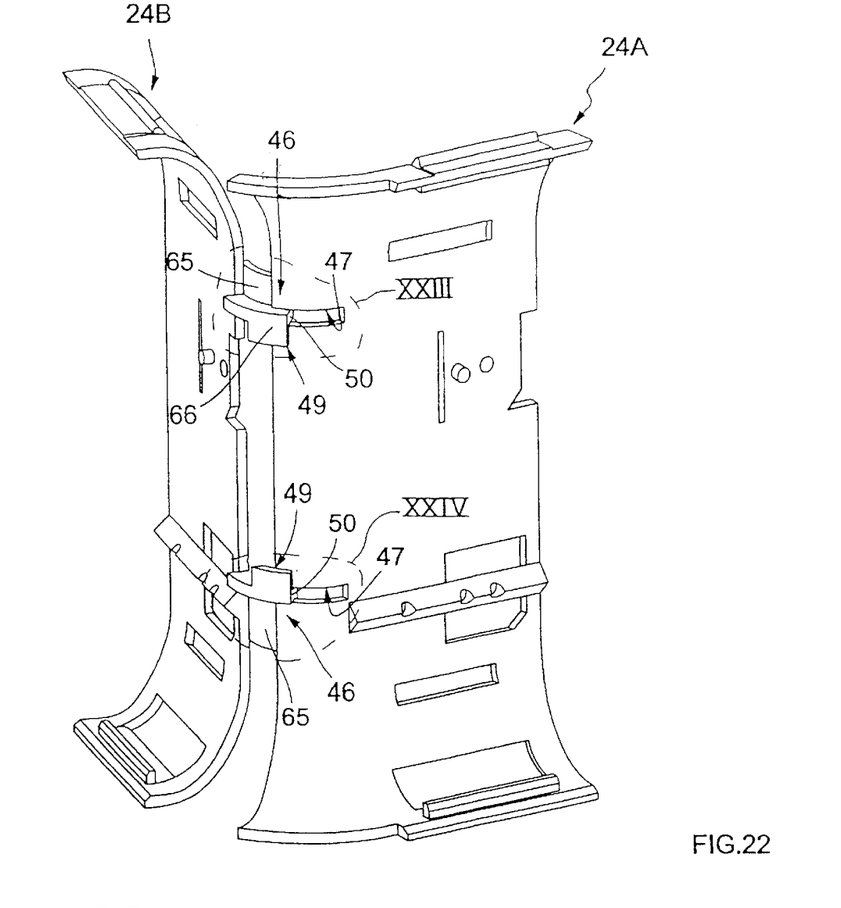
FIG. 22 is a perspective view of these same supports, seen from the rear.
Figure 23:
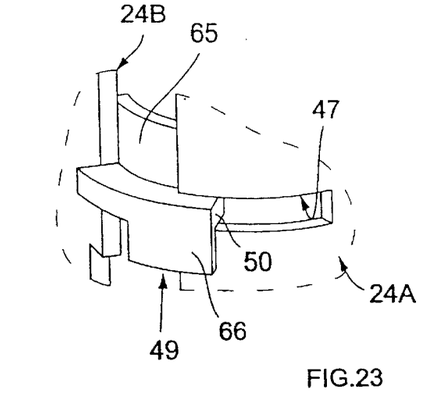
FIGS. 23 and 24 show again, at a bigger scale, the details of FIG. 22 marked by the outlines XXIII and XXIV in this FIG. 22.
Figure 24:
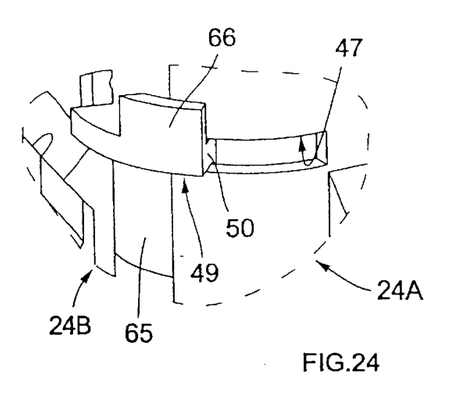
Figure 25:
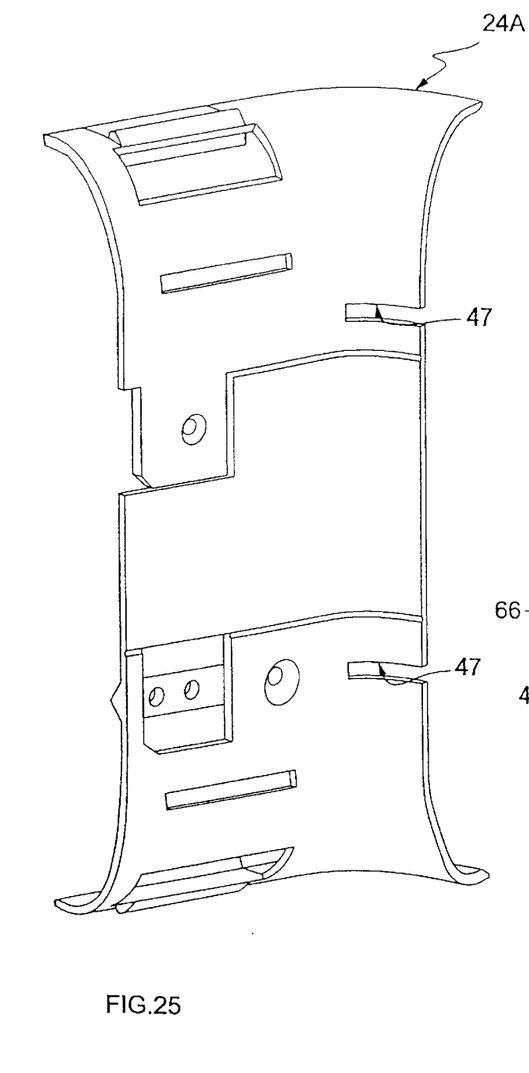
FIG. 25 is a perspective view of one of these supports, seen from the front.
Figure 26:
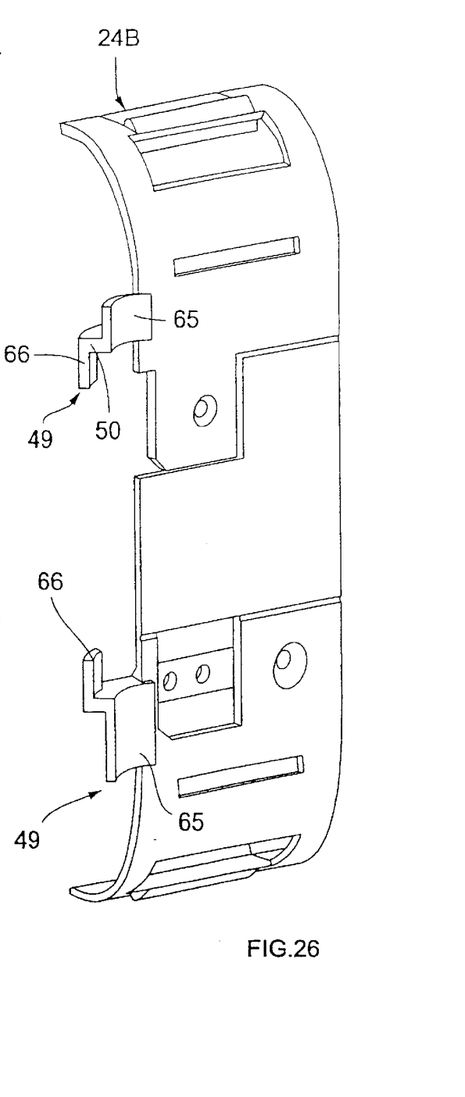
FIG. 26 is a perspective view of the other one of these supports, also seen from the front.

The ribs 16, 16', which are the extreme ribs, one upper and the other lower, and which, in the shown embodiment, are of different height and structure, each comprise, on their backs, as is better seen in FIG. 18, a perpendicular turn-back 19, for the click engagement of the cover 14.

The rib 17, which is a central rib, forms a partition which globally divides the internal volume of the conduit sections 11A, 11B into two compartments.

In the shown embodiment, from this rib 17 there is formed in one piece, on one side of this rib, a separating sheet 20 which extends substantially parallel with the foot-piece 15.

The ribs 18, which occur in pairs on either side of the rib 17, between the latter and the ribs 16, 16', each globally forms a groove, for example for the housing of any equipment or any accessory, not shown, or for receiving screws, also not shown.

With regard to the cover 14, it will suffice, as a corollary, to mention that as it is globally concave, in order to cover the foot-piece 15, it has, in the shown embodiment, a substantially flat central part and globally curved lateral parts and that, as is better seen in FIG. 18, it comprises, longitudinally and protruding from its internal surface, in the vicinity of each of its longitudinal edges, but recessed with respect to the latter, a rib 22, 22' which, for its click engagement on the perpendicular turn-back 19 of the corresponding rib 16, 16' of the base 13, is hook-shaped.

In a way which is known in itself, the angle accessory 10 according to the invention comprises a mask 23 capable of extending between the covers 14 of the two conduit sections 11A, 11B.

According to the invention, this angle accessory 10 also comprises two supports 24A, 24B, one for each conduit section 11A, 11B, each of these two supports 24A, 24B having, according to the arrangements described in more detail below, on the one hand assembly means 25 capable of making it possible for it to be fitted onto the base 13 of the corresponding conduit section 11A, 11B and, on the other and, receiving means 26 capable of making it possible to attach the mask 23 thereto and, in conjunction, the mask 23 is itself divided into two separate side walls 23A, 23B, one side wall 23A, 23B per support 24A, 24B and therefore one side wall 23A, 23B per conduit section 11A, 11B.

In the shown embodiments, both of the supports 24A, 24B globally have similar structures but, as will become apparent below, they are however different.

In practice, in these embodiments, each of the supports 24A, 24B comprises at least three sections 28A, 29A 28'A, 28B, 29B 28'B which, distributed over its length or height, that is to say in a transverse direction with respect to the conduit sections 11A, 11B, are capable of being separated from each other, namely two lateral sections 28A, 28'A, 28B, 28'B, one upper and the other lower, and at least one central section 29A, 29B and, according to the arrangements described in more detail below, assembly means 30 are provided between the lateral sections 28A, 28'A, 28B, 28'B.

For example, and such as shown, only one central section 29A, 29B is provided for each of the supports 24A, 24B.

In the shown embodiments, the three sections 28A, 29A, 28'A, 28B, 29B 28'B of a support 24A, 24B are connected to each other by weak frangible zones 32.

For example, and such as shown, these weak zones 32 are materialised by grooves hollowed into the external surface of the supports 24A, 24B.

Figure 5:
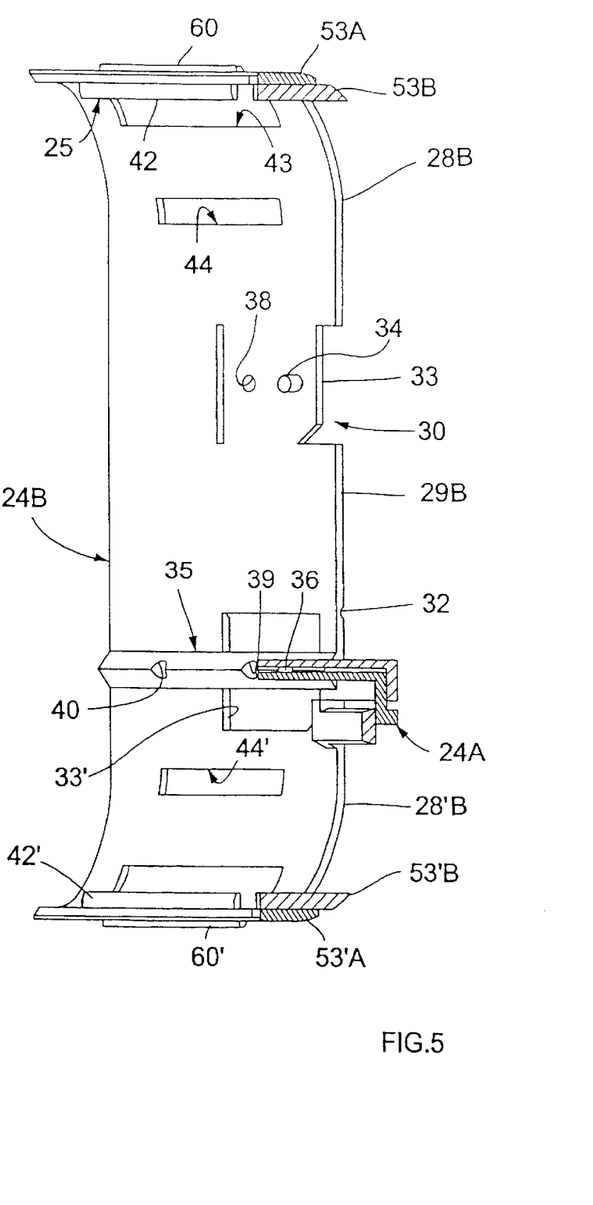
FIG. 5 is, at a different scale, a cross-sectional view substantially along the line V—V of FIG. 2.
Figure 6:
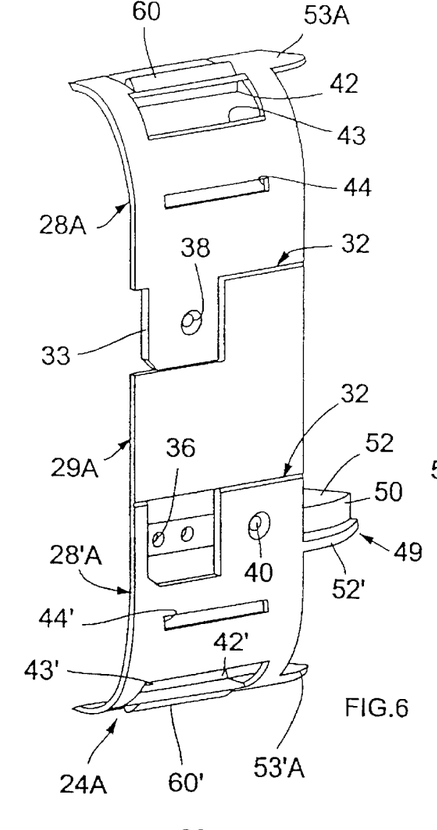
FIG. 6 is, at the same scale as FIG. 5, a perspective view of one of these supports, seen from the front.
Figure 7:
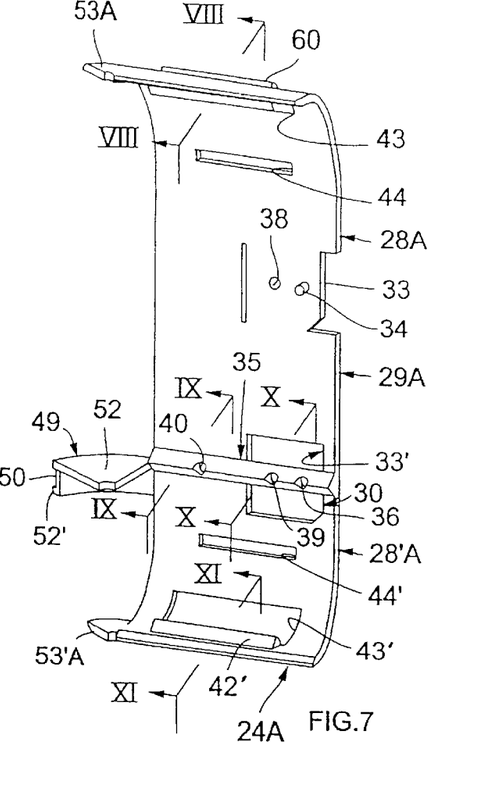
FIG. 7 is another perspective view of this support, seen from the rear.
Figure 8:
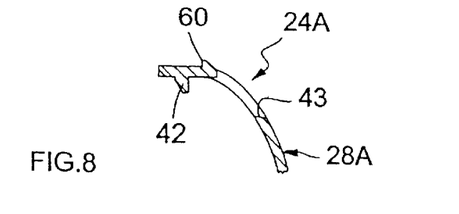
FIGS. 8, 9, 10 and 11 are, at a bigger scale, partial cross-sectional views along the lines VIII—VIII, IX—IX, X—X, and XI—XI respectively of FIG. 7.
Figure 9:
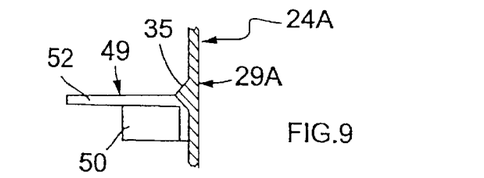
Figure 10:
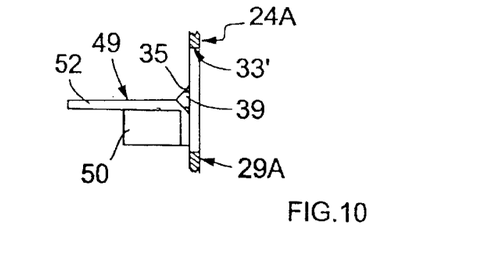
Figure 11:
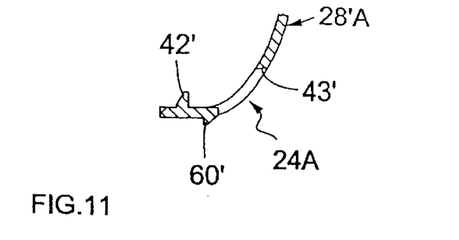
Figures 12, 13:
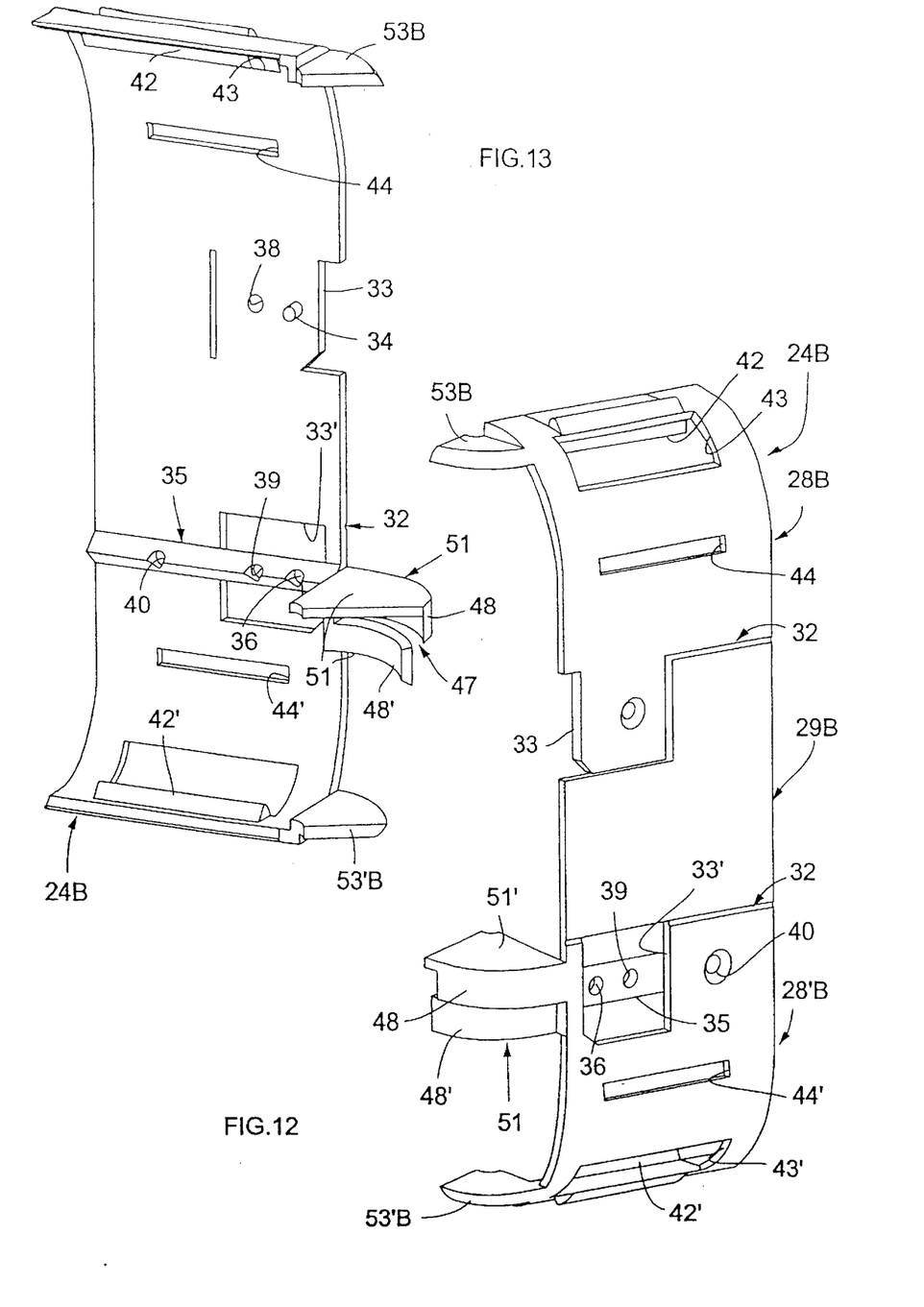
FIGS. 12 and 13 are perspective views which, being similar to FIGS. 6 and 7 respectively, relate to the other one of the supports which the angle accessory according to the invention comprises.
Figure 14:
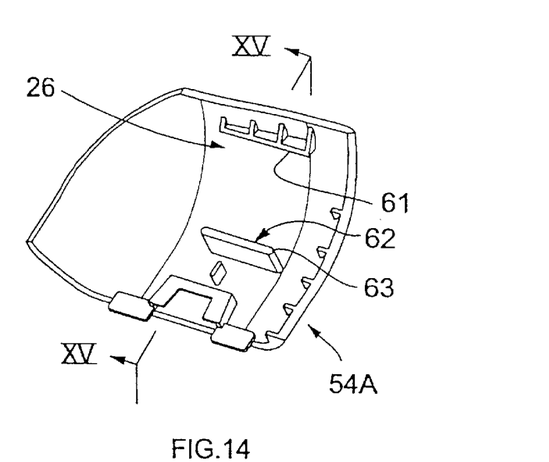
FIG. 14 is a perspective view of one of the constituent parts of one of the side walls of the mask of the angle accessory according to the invention, seen from the rear.
Figure 15:
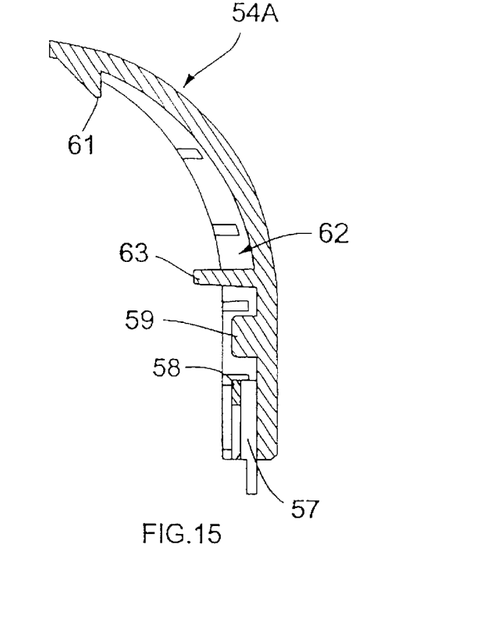
FIG. 15 is, at a bigger scale, a cross-sectional view of this part of this side wall, along the line XV—XV of FIG. 14.

In the embodiments shown, the assembly means 30 provided between the two lateral sections 28A, 28'A, 28B, 28'B of a support 24A, 24B comprise, on the one hand, on one of these lateral sections 28A, 28A, 28B, 28'B, in this case on the upper lateral section 28A, 28B, at least one lug 33, which locally extends this lateral section 28A, 28B and upon which protrudes, on its internal surface, substantially perpendicular to its thickness, at least one pin 34, FIG. 5, and, on the other hand, on the other one of these lateral sections 28A, 28'A, 28B, 28'B, in this case on the lower lateral section 28'A, 28'B, at least one notch 33' which is capable of receiving the lug 33 of the preceding lateral section 28A, 28B, and this being assisted by a bar 35 having at least one opening 36 capable of being engaged by the corresponding pin 34.

For example, and such as shown, only one lug 33 is provided on the upper lateral section 28A, 28B and, correspondingly, the lower lateral section 28'A, 28'B has only one notch 33'.

Because of the lug 33, the groove materialising the weak zone 32 which occurs between the upper lateral section 28A, 28B and the central section 29A, 29B follows a zigzag path.

On the other hand, the groove materialising the weak zone 32 which extends between the central section 29A, 29B and the lower lateral section 28'A, 28'B is straight.

In the shown embodiments, the lug 33 comprises only one pin 34.

But, for reasons which will appear below, it also comprises, at the level of this pin 34, but at a distance from the latter, a piercing 38.

As a corollary, the bar 35 forms a rib which, protruding from the internal surface of the lower lateral section 28'A, 28'B, extends over the whole width of the latter, traversing its notch 33' in so doing.

In practice, this bar 35 is substantially level with the central rib 17 of the base 13 of the corresponding conduit section 11A, 11B and has a triangular profile in cross-section.

In addition to the opening 36, this bar 35 comprises, in correspondence with the piercing 38 of the lug 33 of the upper lateral section 28A, 28B, a piercing 39 suitable for screwing, that is to say for the passage of a screw.

The lower lateral section 28'A, 28'B also comprises a piercing 40 which, in alignment with the opening 36 and the piercing 39 of its bar 35, traverses its bar 35 right through, like the latter.

Like the piercing 39, this piercing 40 is suitable for screwing.

In practice, the supports 24A, 24B have, depending on their height, a profile which is globally similar to the transverse profile of the covers 14.

Their substantially flat central section 29A, 29B extends parallel with the foot-piece 15 of the bases 13.

With regard to their lateral sections 28A, 28'A, 28B, 28'B, these have an overall curved shape, like the lateral sections of the covers 14.

In the shown embodiments, the longitudinal edges of the supports 24A, 24B, that is to say those of their edges which extend globally transversely with respect to the bases 13 of the conduit sections 11A, 11B, are substantially parallel with one another.

Preferably, and such as shown, the assembly means 25 provided between a support 24A, 24B and the base 13 of the corresponding conduit section 11A, 11B are click engagement means.

They comprise, like the ribs 22, 22' of a cover 14, two ribs 42, 42', which protrude from the internal surface of their lateral section 28A, 28'A, 28B, 28'B whilst extending over at least a fraction of the width of the latter, and by which they are capable of being hooked on the perpendicular turn-back 19 of the ribs 16, 16' of the base 13 of the corresponding conduit section 11A, 11B.

In the shown embodiments, these ribs 42, 42' extend along the edge of a window 43, 43' locally forming an opening in the lateral sections 28A, 28'A, 28B, 28'B.

In the shown embodiments, the lateral sections 28A, 28'A, 28B, 28'B of the supports 24A, 24B also have openings, locally, for reasons which will become apparent below, in the form of another window 44, 44', which, whilst being parallel with the preceding window 43, 43', extends at a distance from the latter, between that window 43, 43' and the associated central section 29A, 29B.

Furthermore, and as will also become apparent below, the assembly means 25 provided between a support 24A, 24B and the base 13 of the corresponding conduit section 11A, 11B comprise at least one piercing suitable for screwing.

It is a matter of the piercing 39 and/or the piercing 40 which such a support 24A, 24B has.

Preferably, and such is the case in the shown embodiments, between the two supports 24A, 24B there are engagement means 46 by which these two supports 24A, 24B are, at least locally, engaged with one another.

These engagement means 46 comprise, in a general manner, in the shown embodiments, on the one hand, on one of the supports 24A, 24B, a slot 47 which, running transversely with respect to that support 24A, 24B, extends between two curved lips 48, 48', an upper one and a lower one, and, on the other hand, in correspondence, on the other of these supports 24A, 24B, an appendage 49 which, protruding from the corresponding longitudinal edge of this support 24A, 24B, locally extends the latter, itself being curved like the preceding curved lips 48, 48', and of which at least an engagement portion 50 is engaged with the slot 47 formed by the latter, such that these engagement means 46 at least partly constitute articulation means.

This being, as more particularly shown in FIGS. 1 to 17, an exterior angle accessory, the slot 47 is part of an appendage 51 which, protruding from the corresponding longitudinal edge of the support 24A, 24B concerned, in this case the support 24B, locally extends the latter.

As a corollary, the appendage 49 is part of the other support 24A, 24B and therefore, in this case, of the support 24A.

In the shown embodiments, the curved lips 48, 48' of the slot 47 are globally centred on an axis parallel with the edge of the dihedral D and the same thing applies globally to the corresponding appendage 49.

In the embodiment more particularly shown in FIGS. 1 to 17, the curved lips 48, 48' of the slot 47 are offset with respect to each other along a direction perpendicular to this edge.

In practice, in this embodiment, these curved lips 48, 48' are each formed by a flange of generally cylindrical shape and the same thing applies to the engagement portion 50 by which the associated appendage 49 is engaged with the slot 47 which they define.

In the shown embodiment, the upper curved lip 48 is stiffened by a flange 51', which extends along its upper edge, substantially perpendicular to the edge of the dihedral D.

Similarly, in this embodiment, the engagement portion 50 of the appendage 49 is stiffened, along its upper edge, by a flange 52, which also extends substantially perpendicular to the edge of the dihedral D, under the preceding flange 51' and, along its lower edge, by a bar 52'.

When, as shown in FIGS. 1 to 17, the angle accessory 10 is an exterior angle accessory, there is a slot 47 and an appendage 49 at only one level over the height or length of the supports 24A, 24B.

In the shown embodiments, the engagement means 46 which are located between the two supports 24A, 24B furthermore comprise at least two brackets 53A, 53'A 53B, 53'B which, each one being integral with one of these two supports 24A, 24B respectively, and transversely protruding from their corresponding longitudinal edge, mutually overlap at least partially, whilst being substantially in contact with one another, such that these engagement means 46 at least partly constitute positioning means.

In practice, in these embodiments, there are brackets 53A, 53'A, 53B, 53'B at at least two different levels of the supports 24A, 24B.

For example, and such as shown, the brackets 53A, 53B, 53'A, 53'B are at the ends of the supports 24A, 24B, the brackets 53A, 53B at their upper ends and the brackets 53'A, 53'B at their lower ends.

In the shown embodiment, the brackets 53A, 53'A of one of the supports 24A, 24B, in this case the support 24A, fit around the brackets 53B, 53'B of the other one of these supports 24A, 24B, in this case the support 24B.

In the shown embodiment, each of the side walls 23A, 23B of the mask 23 comprises at least three sections 54A, 55A, 54'A, 54B, 55B, 54'B which, distributed over its length or height, are engaged with each other by assembly means 56, namely two lateral sections 54A, 54'A, 54B, 54'B and a central section 55A, 55B.

Preferably, and such as shown, the assembly means 56 provided between the various sections 54A, 55A, 54'A, 54B, 55B, 54'B of one side wall 23A, 23B of the mask 23 comprise female 57 and male 57' interlocking elements which operate parallel with the thickness of such a side wall 23A, 23B.

More precisely, the lateral sections 54A, 54'A, 54B, 54'B of a side wall 23A, 23B of the mask 23 comprise, in one case, a female interlocking element 57, in the form of a bottomless pocket and, in the other case, a male interlocking element 57' in the form of a lug, and the associated central section 55A, 55B comprises, in a complementary manner, a male interlocking element 57' on one of its transverse edges, in this case its upper transverse edge, and a female interlocking element 57 of the other one of them, in this case the lower transverse edge.

Figure 16:
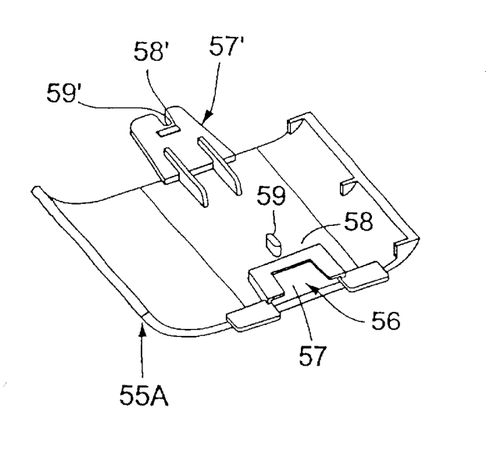
FIG. 16 is a perspective view of another of the constituent parts of the latter, seen from the rear.
Figure 17:
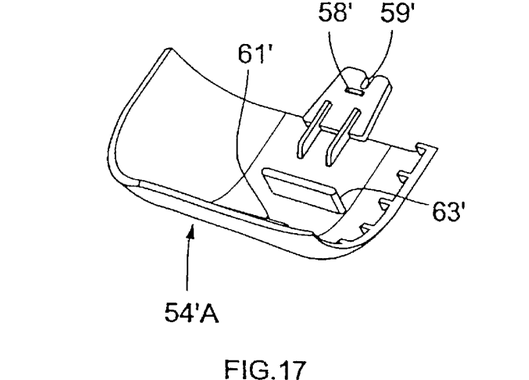
FIG. 17 is a perspective view of another of these parts, also seen from the rear.

To enable its hooking onto the free edge 58 of the bottomless pocket forming a female interlocking element 57, a lug forming a male interlocking element 57' comprises, protruding from its internal surface, a rib 58', FIGS. 16 and 17.

Furthermore, to enable a relative centring between the sections 54A, 55A, 54'A, 54B, 55B, 54'B in question, the lug forming a male interlocking means 57' has, recessed into its free edge, a notch 59' by which it is capable of being engaged on a rib 59 provided beyond the bottomless pocket forming a female interlocking element 57.

In the shown embodiment, the central section 55A, 55B of the supports 24A, 24B is globally curved in a single direction of curvature, to which correspond generatrices parallel with the edge of the dihedral D.

On the other hand, the lateral sections 54A, 54B, 54'A, 54'B of these side walls 23A, 23B are curved in two directions of curvature, one being orthogonal with respect to the other, one being substantially parallel with the edge of the dihedral D and the other being substantially perpendicular to this edge.

In the shown embodiments, the receiving means 26 which a support 24A, 24B has for the attachment of the corresponding side wall 23A, 23B of the mask 23 are click engagement means.

In practice, in these embodiments, these receiving means 26 comprise ribs 60, 60' which protrude from the exterior surface of their lateral sections 28A, 28B, 28'A, 28'B at the edge of their window 43, 43' and, for co-operating in click engagement with these ribs 60, 60', the lateral sections 54A, 54B, 54'A, 54'B of the corresponding side walls 23A, 23B, which themselves comprise ribs 61, 61' protruding from their internal surface.

Preferably, and such is the case in the shown embodiments, interlocking means 62 are finally provided between the side walls 23A, 23B of the mask 23 and the corresponding supports 24A, 24B.

For example, and such as shown, these interlocking means 62 comprise ribs 63, 63', which protrude from the inner surface of the lateral sections 54A, 54B, 54'A, 54'B of the side walls 23A, 23B of the mask 23 and which are themselves capable of being engaged in the windows 44, 44' of the lateral sections 28A, 28'A, 28B, 28'B of the supports 24A, 24B.

On assembly, the supports 24A, 24B are thus click engaged on the bases 13 of the conduit sections 11A, 11B.

Figure 1:
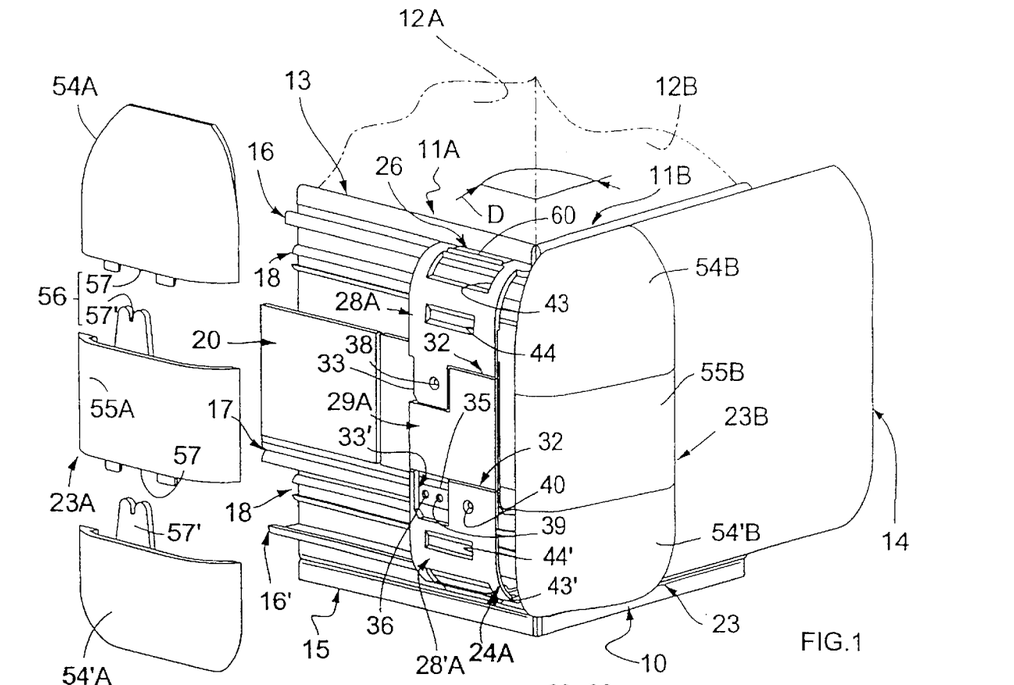
FIG. 1 is a perspective view, partly exploded, of an angle accessory according to the invention, shown in position on two conduit sections, for an embodiment corresponding to an exterior angle.
Figure 2:
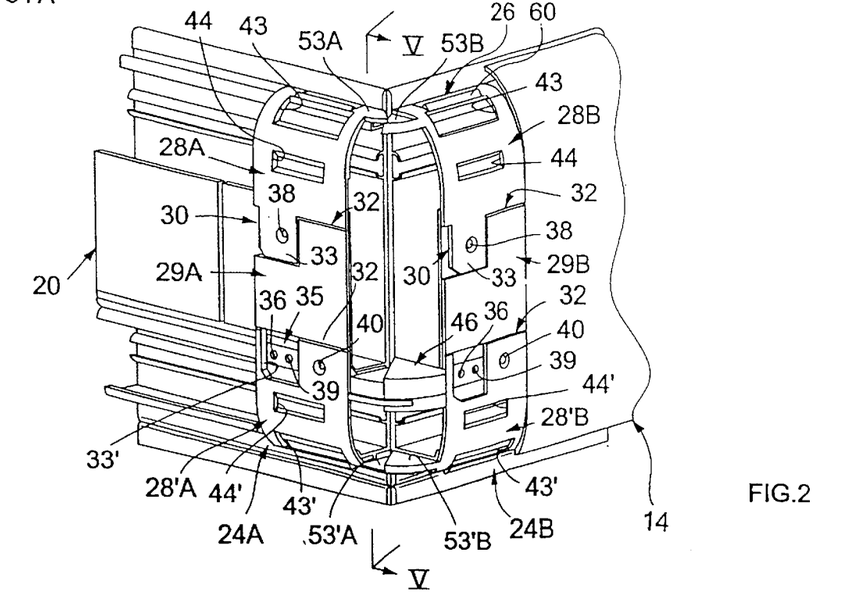
FIG. 2 is a perspective view similar to that of FIG. 1, after removal of the two side walls of the mask which this angle accessory comprises.
Figure 3:
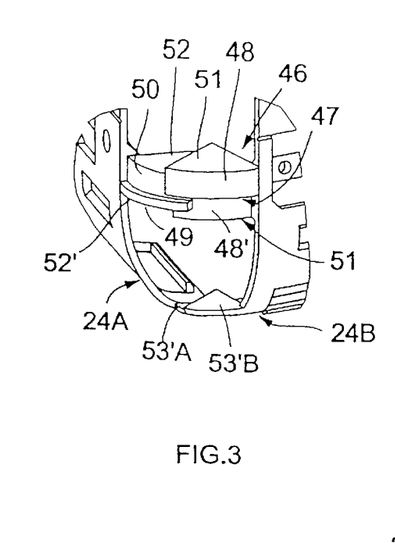
FIG. 3 is, at a larger scale, a partial perspective view of the two supports which this angle accessory also comprises, seen from the front.
Figure 4:
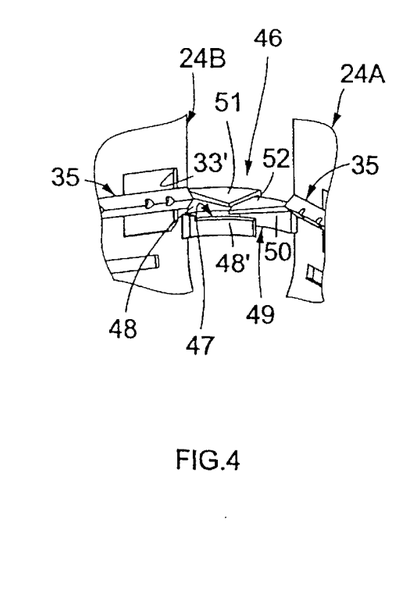
FIG. 4 is a partial perspective view of these two supports, seen from the rear.

The cover 14 of each of the conduit sections 11A, 11B is therefore cut to a length which is less than that of the corresponding base 13 in order that, after its click engagement on that base 13, it is situated in alignment with the support 24A, 24B which is already in position on the latter, for example butting against this support 24A, 24B, as shown in FIG. 2.

After assembling their parts 54A, 55A, 54'A, 54B, 55B, 54'B, the two side walls 23A, 23B of the mask 23 are in their turn each respectively click engaged onto the supports 24A, 24B.

They therefore overlap each other in their junction zone, the side wall 23A, for example, therefore in practice locally covering the side wall 23B and, in conjunction, they each respectively overlap the cover 14 of the conduit sections 11A, 11B, by locally covering the corresponding end of that cover 14.

As it is easy to understand, the interlocking means 62 provided between the side walls 23A, 23B of the mask 23 and the supports 24A, 24B used according to the invention advantageously make it possible to limit, during possible mechanical shocks on the side walls 23A, 23B, the displacement of these side walls 23A, 23B with respect to the supports 24A, 24B, such that this displacement remains in all certainty less than that which is necessary for a coming apart from the receiving means 26 which are furthermore between them and these supports 24A, 24B.

As it is also easy to understand, whilst contributing to the positioning of the supports 24A, 24B with respect to each other, the brackets 53A, 53B, 53'A, 53'B at the ends of these supports 24A, 24B advantageously ensure at their level all of the desirable continuity of protection between the conduit sections 11A, 11B, particularly with respect to the penetration of any wire of small diameter inside the internal volume of the latter, as stipulated in the applicable standard recommendations.

If desired, the fixing of the supports 24A, 24B to the base 13 of the conduit sections 11A, 11B, already provided by the assembly means 25 provided for this purpose, in this case click engagement means, can be reinforced by screwing, using the piercing 40 in the lower lateral section 28'A, 28'B of these supports 24A, 24B, and/or the piercing 39 of their bar 35, the corresponding screw or screws biting, in order to do this, into the rib 17 of such a base 13.

In the embodiment shown in FIGS. 18 to 26, the dihedral D formed by the surfaces 12A, 12B is an inward dihedral.

The angle accessory 10 according to the invention then used comprises, as before, a mask 23 divided into two separate side walls 23A, 23B and two supports 24A, 24B for the fixing of these side walls 23A, 23B.

The side walls 23A, 23B of the mask 23 have, in overall terms, the same structure, in three sections 54A, 54'A, 55A, 54B, 54'B, 55B, as the preceding ones with, between these sections 54A, 54'A, 55A, 54B, 54'B, 55B, assembly means 56, having a female interlocking element 57 and a male interlocking element 57' of the same type.

These side walls 23A, 23B will not therefore be described again in detail here.

It will suffice to mention that their general configuration is simply adapted to that of in interior angle.

Similarly, the supports 24A, 24B, in overall terms, have a structure in three sections 28A, 29A, 28'A, 28B, 29B, 28'B similar to that of the supports 24A, 24B described previously with, between these three sections 28A, 29A, 28'A, 28B, 29B, 28'B weak frangible zones 32.

Neither will these therefore be described here in all their details.

It is appropriate however to mention that, although the support 24B has a configuration similar to that of the preceding support 24B, with longitudinal edges which are substantially parallel with one another, the same does not apply to the support 24A, the longitudinal edges of the latter in this case extending in planes which form a dihedral between them, for adaptation of the assembly to an inward dihedral D.

As before, between the two supports 24A, 24B there are engagement means 46 by which these two supports 24A, 24B are, at least locally, engaged with one another.

Also as before, these engagement means 46 comprise, on the one hand, on one of these supports 24A, 24B, a slot 47 which, running transversely with respect to this support 24A, 24B, extends between two curved lips 48, 48', an upper one and a lower one, and, on the other hand, in correspondence on the other one of these supports 24A, 24B, an appendage 49 which, protruding from the longitudinal edge of this support 24A, 24B, locally extends the latter, itself being curved like the preceding curved lips 48, 48', and of which at least one engagement portion 50 is engaged with the slot 47 formed by the latter, such that these engagement means 46 at least partly constitute articulation means.

But, as this is an interior angle accessory, the slot 47 affects the support 24A, 24B in question, in this case the support 24A, on the open surface, starting from the corresponding longitudinal edge of the latter.

In conjunction, the associated appendage 49 is part of the other support 24A, 24B, in this case the support 24B.

In the shown embodiment, the engagement portion 50 of this appendage 49 is a curved bar transversely ensuring a junction between two flanges 65, 66, which both have a generally cylindrical shape, and which are offset with respect to each other, substantially perpendicularly to the edge of the dihedral D, that is to say a front flange 65, by which the appendage 49 engages from the front on one of the curved lips 48, 48' of the slot 47, locally overlapping this curved lip 48, 48', and a rear flange 66, by which this appendage 49 engages from the rear on the other one of these curved lips 48, 48', also locally overlapping this curved lip 48, 48'.

In practice, these flanges 65, 66 are directed in opposite directions with respect to each other.

Also in practice, there is thus a slot 47 and an appendage 49 at at least two different levels of the supports 24A, 24B.

For example, and such as shown, only two slots 47 are provided on the support 24A, and each one respectively affects the two lateral sections 28A, 28'A of the latter and, in correspondence, only two appendages 49 are provided on the support 24B and each of them projects from one of the two lateral sections 28B, 28'B of the latter respectively.

But, from one appendage 49 to the other, the flanges 65 are directed in opposite directions, and the same thing applies to the flanges 66.

Finally, as this is an interior angle accessory, no brackets are provided at the ends of the supports 24A, 24B.

As for the rest, the arrangements are of the same type as those described previously.

Similarly, the positioning is carried out as described previously.

In the above, it has been assumed that, as their length or height corresponded to the width of the base 13 of the conduit sections 11A, 11B, the supports 24A, 24B were used over the whole length or height and that the same thing therefore applied to the side walls 23A, 23B of the mask 23.

The length or height of the supports 24A, 24B can however be reduced, for their adaptation to the conduit sections 11A, 11B whose base 13 itself correspondingly has a reduced width.

Figure 27:
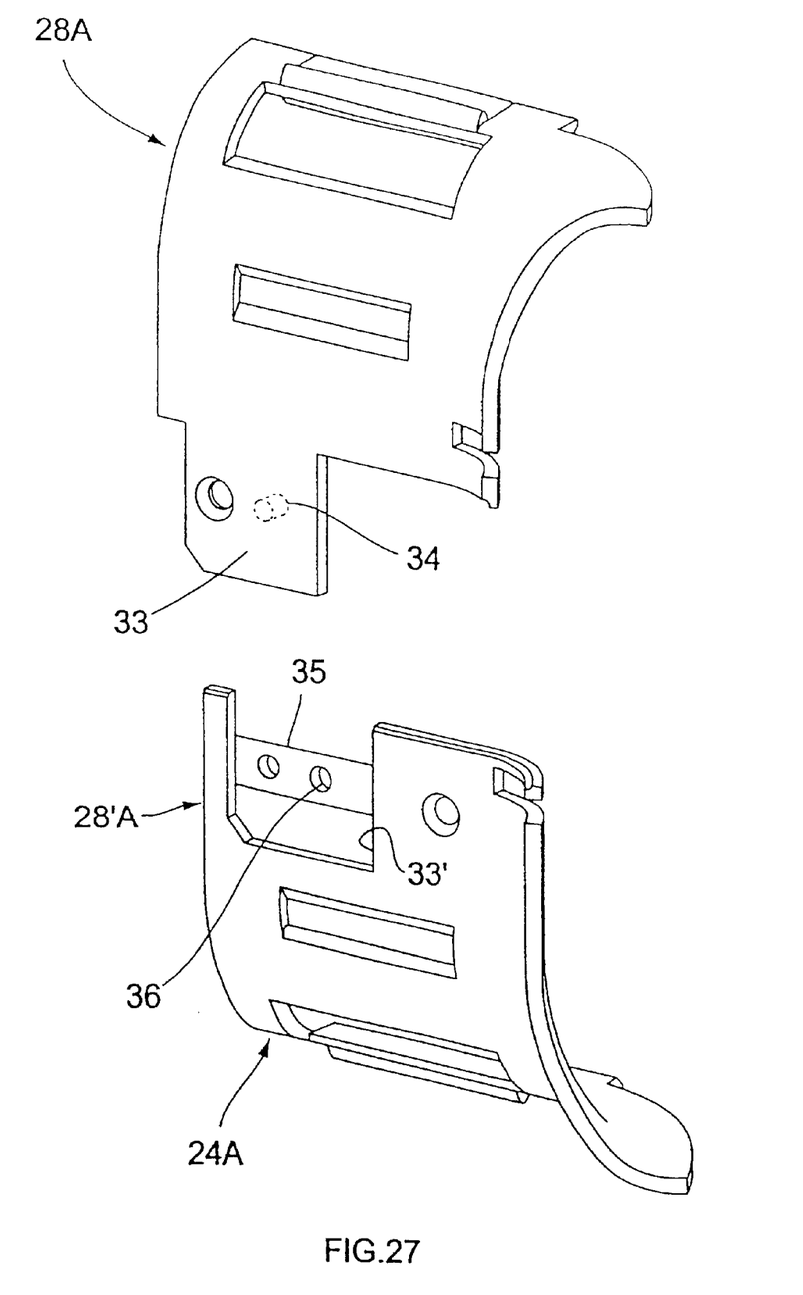
FIG. 27 is another perspective view of the support shown in FIG. 25, after elimination of its central section.

In order to do this, it suffices, as shown for a support 24A in FIG. 27, to eliminate the central section 29A, 29B of these supports 24A, 24B, by fracturing at the level of their weak zone 32, and to butt their lateral sections 28A, 28'A, 28B, 28'B directly, using the assembly means 30, having lugs 33 and notches 33' provided for this purpose, the pin 34 of the lug 33 jointly engaging in the opening 36 provided for it on the bar 35, this happening with the help of the notch 33'.

In FIG. 27, the support 24A is of the type described with reference to FIGS. 18 to 26.

It follows that, as a variant, it could be of the type described with reference to FIGS. 1 to 17.

Furthermore, the present invention is not limited to the embodiments described and shown, but covers any variant embodiment and/or combination of their various elements.

What is claimed is:

1. An angle accessory for joining two conduit sections at a dihedral angle, the angle accessory comprising:
    a mask extendable between covers of the two conduit sections for locally covering an end of each cover; and
    two supports, one support for each of the two conduit sections,
    each support comprising
       an assembly means allowing said support to be mounted on a base of a corresponding one of the two conduit sections, and
       a receiving means allowing said mask to be attached to said support,
       said mask being divided into two separate side walls, each one of said side walls attachable via said receiving means to a corresponding support, and by attachment by the corresponding support each side wall is attached to one of the two conduit sections.

2. An angle accessory for joining two conduit sections at a dihedral angle, each of the two conduit sections respectively running over one of two surfaces, the angle accessory comprising:
    a mask extendable between covers of the two conduit sections for locally covering an end of each cover;
    two supports, one support for each of the two conduit sections,
    each support comprising
       an assembly means allowing said support to be mounted on a base of a corresponding one of the two conduit sections, and
       a receiving means allowing said mask to be attached to said support,
       said mask being divided into two separate side walls, each one of said side walls attachable via said receiving means to a corresponding support, and by attachment by the corresponding support each side wall is attached to one of the two conduit sections; and
    an engagement means located between the two supports providing at least local engagement of the two supports with each other.

3. An angle accessory for joining and providing continuity between two conduit sections at a dihedral angle, each of the two conduit sections respectively running over one of two surfaces, the angle accessory comprising:
    a mask extendable between covers of the two conduit sections for locally covering an end of each cover;
    two supports, one support for each of the two conduit sections,
    each support comprising
       an assembly part extending along two parallel edges of said support to be mounted on a complementary assembly part provided along two longitudinal edges of a base of a corresponding one of the two conduit sections, and
       a receiving means allowing said mask to be attached to said support,
       said mask being divided into two separate side walls, each one of said side walls attachable via said receiving means to a corresponding support, and by attachment by the corresponding support each side wall is attached to one of the two conduit sections.

4. The angle accessory according to claim 1, further comprising at least one engagement means located between the two supports and, at least locally, engaging the two supports with one another.

5. The angle accessory according to claim 4, characterized in that the engagement means comprises:
    a first portion attached to a first of the two supports,
    the first portion comprising a slot which, running transversely with respect to the first support, extends between two curved lips, and
    in correspondence, a second portion attached to a second of the two supports,
    the second portion comprising an appendage protruding from a longitudinal edge of the second of the supports to locally extend the second support,
    the appendage being curved complimentary to the curved lips,
    the appendage comprising at least an engagement portion engaged with the slot such that the engagement means at least partly constitutes an articulation means.

6. The angle accessory according to claim 5, characterized in that, when the angle accessory is configured as an interior angle accessory, the slot is on an open surface of the first support, starting from a corresponding longitudinal edge of the first support.

7. The angle accessory according to claim 6, characterized in that the engagement portion of the appendage of the second support is a curved bar with two flanges which are offset with respect to each other,
    one of the two flanges being a front flange engaged from a front side on one of the two curved lips of the slot, and
    the other of the two flanges being a rear flange engaged from a rear side on an other one of the two curved lips.

8. The angle accessory according to claim 5, characterized in that, when the angle accessory is configured as an exterior angle accessory, the slot is part of an element protruding from a corresponding longitudinal edge of the first support to locally extend the first support.

9. The angle accessory according to claim 8, characterized in that the two curved lips are offset with respect to each other.

10. The angle accessory according to claim 9, characterized in that the two curved lips are each formed by a flange of generally cylindrical shape.

11. The angle accessory according to claim 5, characterized in that the two curved lips of the slot are globally centered on an axis parallel with an edge of the dihedral angle.

12. The angle accessory according to claim 5, characterized in that there are at least two of said engagement means.

13. The angle accessory according to claim 4, characterized in that the engagement means which are located between the two supports comprise at least two brackets,
   one of each of the two brackets being integral with one of the two supports respectively, and transversely protruding from corresponding longitudinal edges of the two supports
   the two supports mutually overlapping each other at least partially,
   the two supports being substantially in contact with each other, wherein the engagement means at least partly constitute positioning means.

14. The angle accessory according to claim 13, characterized in that there are at least two of said engagement means.

15. The angle accessory according to claim 14, characterized in that the brackets are at the ends of the supports.

16. The angle accessory according to claim 14, characterized in that the brackets of one of the supports fit around the brackets of the other one of the supports.

17. The angle accessory according to claim 3, characterized in that the assembly means is a click engagement means.

18. The angle accessory according to claim 3, characterized in that the assembly part comprises at least one piercing suitable for screwing.

19. The angle accessory according to claim 3, characterized in that each of the supports comprises:
   at least three sections which, distributed over a length or a height of the support, are capable of being separated from one another, the three sections being two lateral sections and at least one central section; and
   said assembly part means provided between the two lateral sections.

20. The angle accessory according to claim 19, characterized in that the assembly part means provided between the two lateral sections comprise:
   on one of the two lateral sections, at least one lug, which locally extends the one lateral section and upon which one lug protrudes, substantially perpendicular to a thickness of the one lug, at least one pin,
   on the other one of the two lateral sections, at least one notch which is capable of receiving the lug of the preceding lateral section, and
   a bar assisting the notch to receive the lug by having at least one opening capable of being engaged by the pin.

21. The angle accessory according to claim 19, characterized in that the two lateral sections are connected to the at least one central section by weak frangible zones.

22. The angle accessory according to claim 3, characterized in that the receiving means is a click engagement means.

23. The angle accessory according to claim 3, characterized in that each of the side walls of the mask comprises at least three sections engaged with each other by the assembly part,
   the three sections being two lateral sections and one central section.

24. The angle accessory according to claim 23, characterized in that the assembly part comprise female and male interlocking elements which operate parallel with a thickness of a corresponding side wall.

25. The angle accessory according to claim 24, characterized in that the two lateral sections comprise a first lateral section with a female interlocking element and a second lateral section with a male interlocking element, and the central section comprises, in a complementary manner, a male interlocking element on one transverse edge, and a female interlocking element on another transverse edge.

26. The angle accessory according to claim 3, characterized in that interlocking means are provided between the two side walls of the mask and the two supports.

* * * * *

UNITED STATES PATENT AND TRADEMARK OFFICE
CERTIFICATE OF CORRECTION

PATENT NO. : 6,599,056 B1
DATED : July 29, 2003
INVENTOR(S) : David Piole et al.

It is certified that error appears in the above-identified patent and that said Letters Patent is hereby corrected as shown below:

<u>Title page,</u>
Amend Item [22] to read as follows:
-- [22] PCT Filed: Jun. 8, 1999 --.

Signed and Sealed this

Ninth Day of September, 2003

JAMES E. ROGAN
*Director of the United States Patent and Trademark Office*